Figures 1, 2, 3, 4:
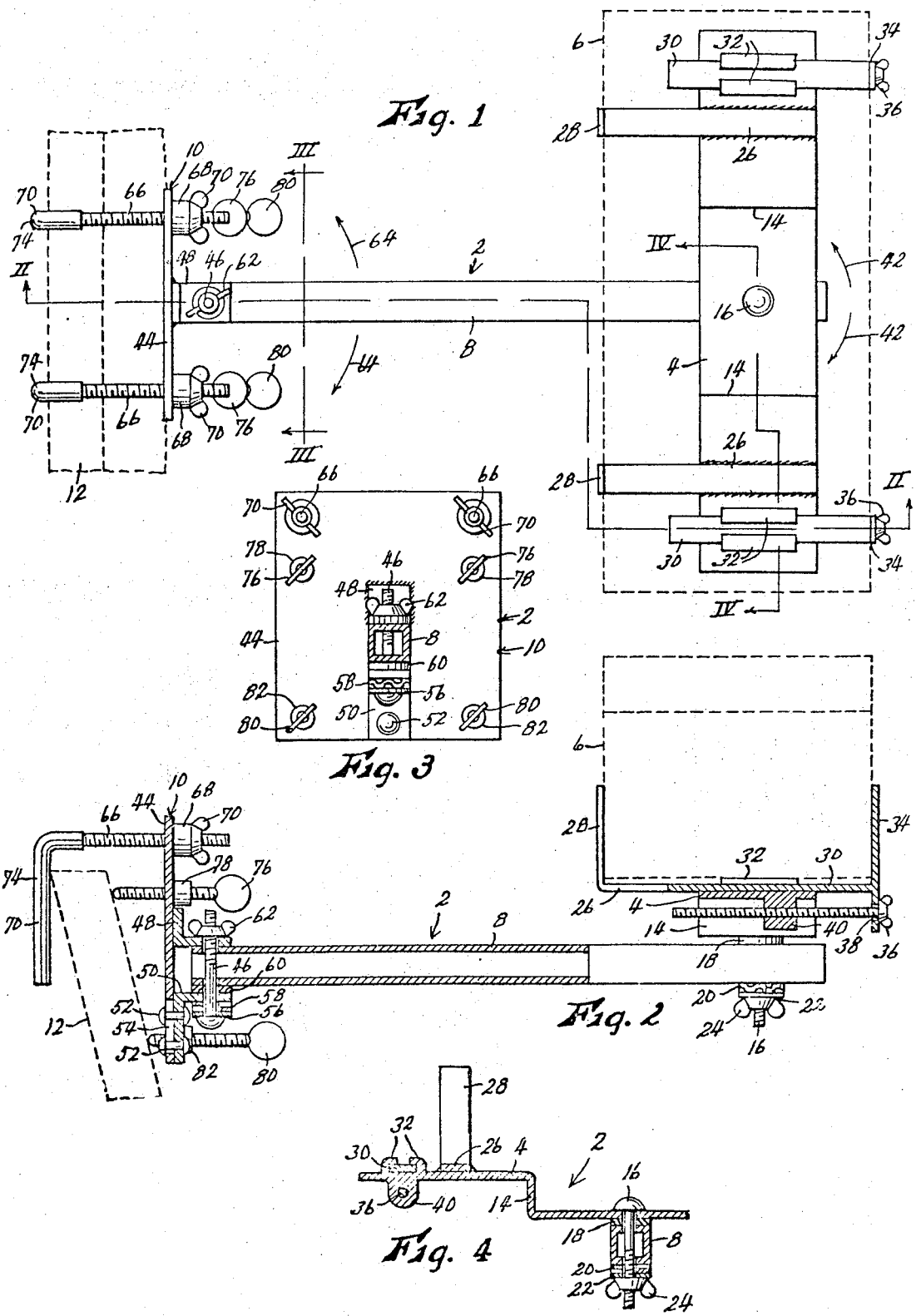

United States Patent [19]

Riggs

[11] 3,765,632
[45] Oct. 16, 1973

[54] TACKLE BOX HOLDER

[76] Inventor: Royal W. Riggs, 2406 Albert Ln., Sedalia, Mo. 65301

[22] Filed: Feb. 2, 1972

[21] Appl. No.: 222,803

[52] U.S. Cl. .............................. 248/229, 248/215
[51] Int. Cl. .............................................. E05d 5/02
[58] Field of Search .................... 248/282, 283, 285, 248/229, 226 B, 214, 215, 311, 313; 211/96; 43/56

[56] References Cited
UNITED STATES PATENTS

| | | | |
|---|---|---|---|
| 2,631,807 | 3/1953 | Witt | 248/313 X |
| 941,591 | 11/1909 | Sweet | 248/282 |
| 3,396,931 | 8/1968 | Eckstein | 248/280 |
| 1,353,853 | 9/1920 | Sandberg | 248/226 BX |
| 936,254 | 10/1909 | Parsons | 248/226 B |

Primary Examiner—J. Franklin Foss
Attorney—John A. Hamilton

[57] ABSTRACT

A tackle box holder including a platform having a tackle box mount carried thereby adjustable to receive and grip tackle boxes of various sizes, the platform being connected by a vertical pivot to the free end of a horizontal arm, a bracket connected by a vertical pivot to the opposite end of the arm and being specially adapted to mount said arm on the gunwale of a boat or the like, and to level the arm, and adjustable friction devices yieldably resisting pivoting of the platform relative to the arm, and of the arm relative to the bracket.

3 Claims, 4 Drawing Figures

PATENTED OCT 16 1973

3,765,632

TACKLE BOX HOLDER

This invention relates to new and useful improvements in tackle box holders, and has as its principal object the provision of a tackle box holder capable of holding a tackle box conveniently and securely for use by a fisherman, particularly a fisherman operating from a small boat, preventing overturning of the box and spillage of its contents.

Another object is the provision of a tackle box holder of the character described which permits movement of the tackle box relative to the boat for greater convenience of use by more than one fisherman occupying the boat, or by one fisherman fishing from different positions in the boat, but which nevertheless may be securely fastened and retained at any desired position within its range.

A further object is the provision of a tackle box holder of the character described which includes a bracket for mounting it on the gunwale or hull wall of a small boat, said bracket having novel provisions for accommodating it to gunwales of different thicknesses, contours, and angles of inclination.

A still further object is the provision of a tackle box holder which is readily adjustable to hold tackle boxes of different sizes and shapes.

Other objects are simplicity and economy of construction, and efficiency and dependability of operation.

With these objects in view, as well as other objects which will appear in the course of the specification, reference will be had to the accompanying drawing, wherein:

FIG. 1 is a top plan view, of a tackle box holder embodying the present invention, shown operatively mounted on a boat gunwale and holding a tackle box, the gunwale and tackle box being shown in dotted lines, FIG. 2 is a sectional view taken on line II—II of FIG. 1, FIG. 3 is a sectional view taken on line III—III of FIG. 1, and FIG. 4 is a fragmentary sectional view taken on line IV—IV of FIG. 1.

Like reference numerals apply to similar parts throughout the several views, and the numeral 2 applies generally to the tackle box holder forming the subject matter of the present invention. Said holder includes, generally, a platform 4 on which a fishing tackle box 6 is to be mounted, a generally horizontal arm 8 at one end of which platform 4 is mounted, and a bracket 10 connected to the opposite end of said arm, and adapted to be attached to the gunwale 12 of a small boat. Platform 4 consists of a generally rectangular metal plate, disposed generally horizontally, with its central portion offset downwardly from its end portions by means of vertical portions 14 thereof. It is pivoted at its midpoint to the outer end of arm 8 by means of a bolt 16, said bolt extending downwardly respectively through the platform 4, a friction washer 18, arm 8, a spring washer 20 and flat washer 22, and having a wing nut 24 threaded on its lower end. Friction washer 18 yieldably resists pivotal movement of the platform relative to the arm, and the degree of resistance can be varied by turning nut 24 to vary the compression of spring washer 20. The spring washer also takes up any wear of the friction washer. As shown, arm 8 is of square cross-sectional contour, in order to provide bearing areas for the washers.

To each of the higher end portions of platform 4 there is welded or otherwise affixed a bar 26 which extends rearwardly of the platform, and then is bent upwardly at right angles to form a fixed keeper post 28. Adjacent each of bars 26, a bar 30 is mounted on the platform. Bar 30 is parallel to bar 26, and is longitudinally slidable in a forward and rearward direction in a pair of guides 32 affixed to the platform. Each bar 30 extends forwardly of the platform, and is affixed at its forward end to a vertical post 34 which extends both upwardly and downwardly from the platform. A horizontal wing bolt 36 is carried rotatably in a hole 38 formed therefor in the downwardly extended portion of post 34, extends rearwardly therefrom, and is threaded through a nut member 40 affixed to the lower surface of the platform. Thus a tackle box 6 of any of a wide variety of front-to-rear dimensions may be rested on the platform against posts 28, as shown, and secured in place by turning screws 36 to bring posts 34 tightly against the front side of the box. The platform and tackle box may then be pivoted on the vertical axis provided by bolt 16, as indicated by arrows 42 in FIG. 1, this pivotal movement being frictionally resisted by friction washer 18. Said friction washer may be adjusted as desired even to the point of substantially resisting any pivotal movement of the platform at all, by selective tightening of wing nut 24. The vertical offsets 14 of the platform permit it to be turned to any degree relative to arm 8 without interference between said arm and screws 36 or nuts 40 of the platform.

The rearward end of arm 8, this being the end thereof opposite to that on which platform 4 is mounted is connected to bracket 10. Said bracket includes a rectangular, normally vertical plate 44, the rearward end of arm 8 being secured, as by a vertical bolt 46, between the horizontal, parallel legs of a pair of angled clips 48 and 50 mounted on the forward face of said plate. Upper clip 48 is rigidly welded or otherwise affixed to the plate, while lower clip 50 is connected to said plate by a pair of rivets 52 extending through a vertically elongated slot 54 of the plate, whereby said lower clip may move toward and from the upper clip. Bolt 46 extends upwardly successively through a flat washer 56, a spring washer 58, clip 50, a friction washer 60, holes provided therefor in arm 8, and clip 48, and has a wing nut 62 threaded on its upwardly extended end. Thus arm 8 may pivot horizontally on bolt 46, as indicated by arrows 64 in FIG. 1, the pivotal movement thereof being resisted by friction washer 60, the frictional holding power of which may be adjusted by turning nut 62.

Bracket plate 44 may be mounted on boat gunwale 12 by three pairs of screws. A first pair of screws 66 are disposed respectively adjacent the upper corners of plate 44, extending slidably at right angles to said plate through bosses 68 affixed to said plate, and having wing nuts 70 threaded thereon forwardly of said plate. Rearwardly of the plate, each screw 66 is downwardly angled to form a hook 72 which is engageable downwardly over the top edge of the gunwale, as best shown in FIG. 2. The downwardly angled portion may be provided with a sheath 74 of rubber or other soft material to avoid marring of the boat hull. A second set of abutment screws 76 are disposed respectively just below each of screws 66, parallel thereto, and are threaded in bosses 78 affixed to the plate, extending forwardly and rearwardly of said plate. A third set of abutment screws 80, identical in all respect to screws 76 and threaded in bosses 82 of the plate, are disposed respectively adjacent the lower corners of the plate. Screws 76 and 80 may be thumb screws, having enlarged heads permitting manual operation thereof. Bracket plate 44 is preferably mounted by first adjusting screws 66 and 80 relatively, with screws 76 retracted well out of engagement with gunwale 12, until said plate is disposed in a vertical plane. This permits said plate to be positioned accurately despite differences of gunwale inclination or contour which may occur from boat to boat, although the bracket is not yet firmly anchored to the boat. The bracket is then securely clamped in place by tightening screws 76.

Operation of the tackle box holder is believed to be self-evident. As shown and described, it will securely hold and position a tackle box of any common size and shape against overturning and spillage of its contents, which is a common source of trouble and irritation to fishermen. It nevertheless permits the tackle box to be moved freely about a substantial area of the boat, to better serve two or more persons fishing from the same boat, or a single fisherman who may desire to move about the boat to fish from different positions. When desired, the friction devices permit the box to be moved only by application of substantial force thereto, so that it will not move accidentally in response to rocking of the boat in the water. Bracket 10 permits the holder to be operatively mounted on the gunwale of the hull of nearly any small boat, without requiring modification or adaptation of the hull in any way.

While I have shown and described a specific embodiment of my invention, it will be readily apparent that many minor changes of structure and operation could be made without departing from the spirit of the invention.

What I claim as new and desire to protect by Letters Patent is:

1. A tackle box holder comprising:
   a. a bracket comprising a normally generally vertical plate.
   b. means carried by said bracket and operable to mount said bracket on the gunwale of a small boat, said bracket mounting means comprising one or more hook members carried by said plate adjacent the upper edge thereof, said hook members opening downwardly to extend over the top edge of, and to engage the outer surface of, a boat gunwale, with essentially point contact, a series of abutment members carried by said plate and projecting therefrom in the same direction as said hook members to engage the inner surface of said boat gunwale, said abutment members being so laterally spaced apart that their projecting ends define a planar area, said hook members and abutment members being adjustably mounted in said plate for movement transversely to the plane thereof to vary the degree of projection of these members from said plate, whereby the plane defined by the projecting ends of said abutment members may be angularly tilted in any direction relative to the plane of said plate, and said plate may thereby be adjusted to a vertical position despite variations in the contour and inclination of said gunwale,
   c. an arm pivoted at one end to said bracket plate on a generally vertical axis, and extending therefrom oppositely to said hook and abutment members whereby to extend inwardly of said boat,
   d. a tackle box platform pivoted to the free end of said arm on a generally vertical axis, and
   e. means carried by said platform and operable to secure a tackle box thereon.

2. A tackle box holder as recited in claim 1 wherein each of said hook members includes a stem normal to said plate and extending slidably through a hole formed therefor in said plate, said stem being threaded and having a nut threaded thereon at the side of said plate form which said arm extends, and wherein each of said abutment members compises a screw disposed normally to the plane of said plate and threaded therein.

3. A tackle box holder as recited in claim 1 wherein one of said abutment members is disposed closely adjacent each of said hook members and is adjustable relative to said plate normally to the plane thereof, whereby said gunwale may be clampingly engaged between said hook member and said abutment member.

* * * * *